US008418336B2

(12) United States Patent
Bennett

(10) Patent No.: US 8,418,336 B2
(45) Date of Patent: Apr. 16, 2013

(54) METHOD AND SYSTEM FOR REPAIRING THE FLOW-LINE OF CORRUGATED METAL PIPES

(75) Inventor: Roger Bennett, Magnolia, TX (US)

(73) Assignee: Roger Michael Bennett, Houston, TX (US)

( * ) Notice: Subject to any disclaimer, the term of this patent is extended or adjusted under 35 U.S.C. 154(b) by 395 days.

(21) Appl. No.: 12/803,729

(22) Filed: Jul. 2, 2010

(65) Prior Publication Data

US 2011/0010907 A1   Jan. 20, 2011

Related U.S. Application Data

(60) Provisional application No. 61/270,338, filed on Jul. 7, 2009.

(51) Int. Cl.
B23P 6/00 (2006.01)
B23P 19/04 (2006.01)

(52) U.S. Cl.
USPC ............... 29/402.09; 29/402.14; 29/402.18; 29/402.15; 29/402.17; 29/402.02; 29/454; 29/237; 29/235

(58) Field of Classification Search ............... 29/402.02, 29/402.09, 402.14, 402.15, 402.17, 402.18, 29/454, 237, 235
See application file for complete search history.

(56) References Cited

U.S. PATENT DOCUMENTS

| 3,070,130 | A | * | 12/1962 | Risley | 138/97 |
| 3,753,766 | A | * | 8/1973 | Brown et al. | 138/97 |
| 4,673,449 | A | * | 6/1987 | Webb et al. | 156/94 |
| 5,334,429 | A | * | 8/1994 | Imoto et al. | 428/36.2 |
| 5,388,317 | A | * | 2/1995 | Johansen et al. | 29/402.18 |
| 5,683,530 | A | * | 11/1997 | Fawley et al. | 156/94 |
| 5,862,581 | A | * | 1/1999 | Miller et al. | 29/451 |
| 5,972,141 | A | * | 10/1999 | Ellyin | 156/94 |
| 6,386,236 | B1 | * | 5/2002 | Buckley | 138/99 |
| 6,539,599 | B2 | * | 4/2003 | Martin et al. | 29/235 |
| 6,703,091 | B1 | * | 3/2004 | Walker | 428/34.5 |
| 6,755,592 | B2 | * | 6/2004 | Janssen | 405/184.1 |
| 6,860,297 | B2 | * | 3/2005 | Manzon | 138/99 |
| 7,401,647 | B2 | * | 7/2008 | Baycroft et al. | 166/277 |
| 7,635,006 | B2 | * | 12/2009 | Edstrom | 138/98 |
| 7,979,970 | B2 | * | 7/2011 | Williams | 29/402.19 |
| 2005/0028339 | A1 | * | 2/2005 | Leon | 29/402.09 |
| 2010/0078118 | A1 | * | 4/2010 | Ehsani | 156/94 |
| 2011/0206920 | A1 | * | 8/2011 | Ehsani | 428/304.4 |
| 2011/0283502 | A1 | * | 11/2011 | Lofving et al. | 29/402.09 |

FOREIGN PATENT DOCUMENTS

JP           05318615 A   *  12/1993

* cited by examiner

Primary Examiner — Essama Omgba
(74) Attorney, Agent, or Firm — Raj Krishnan

(57) ABSTRACT

A system and method for repairing the damaged portion of a flow-line of a Corrugated Metal Pipe is disclosed. A containment mold is created on the interior surface of the CMP using a series of overlapping rigid sheets that are attached to the CMP along the damaged flow-line. This mold is provided with injection ports through which a hydro-insensitive expanding polymer may be injected. External pressure is applied to the rigid sheet during injection and hardening of the polymer. The result is a single monolithic structure forming a patch over the damaged CMP flow-line.

20 Claims, 6 Drawing Sheets

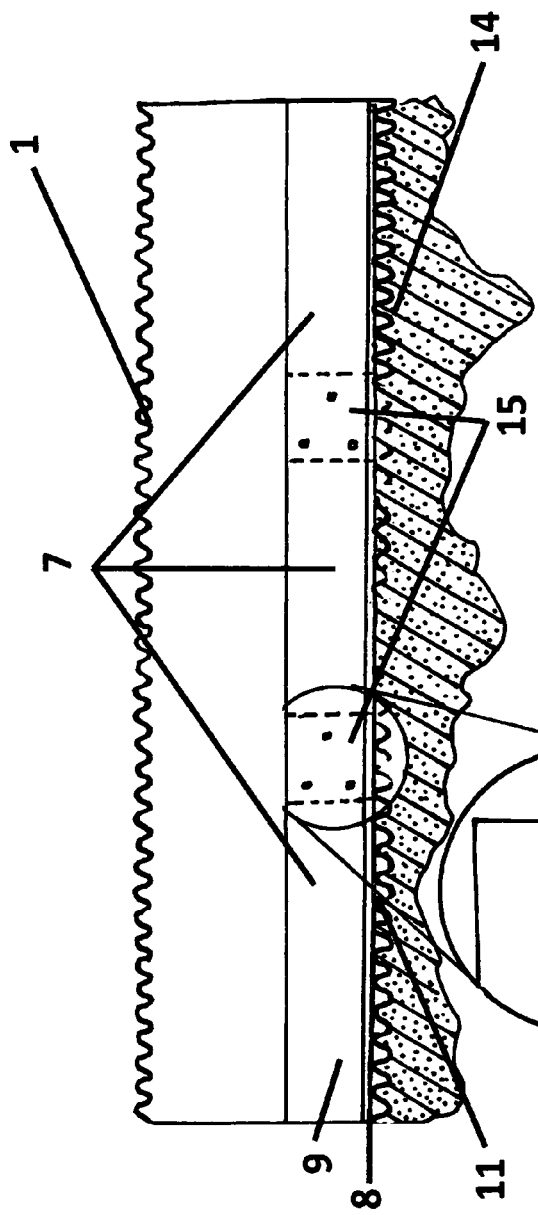
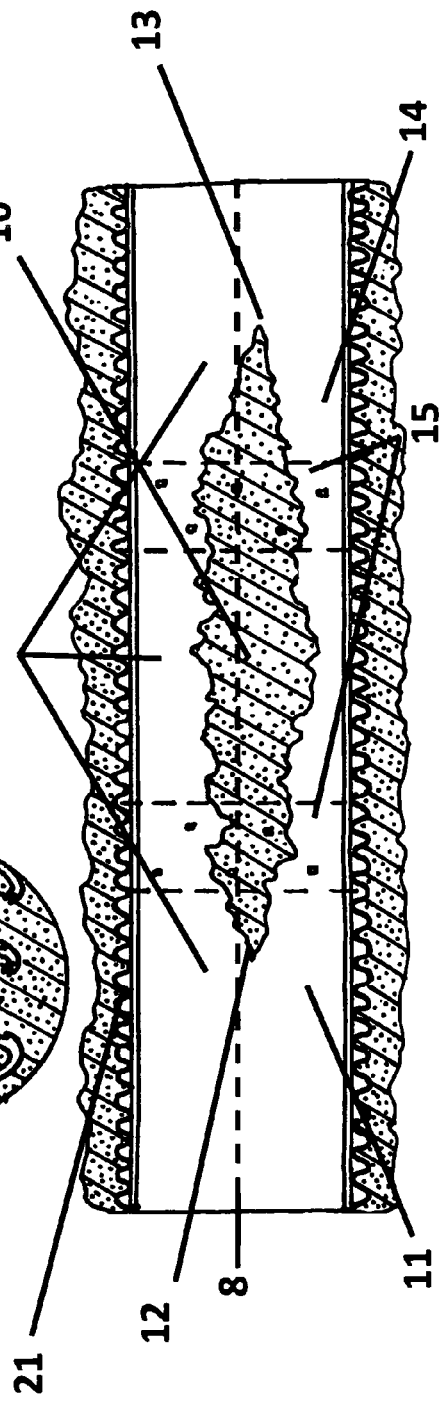

METHOD AND SYSTEM FOR REPAIRING THE FLOW-LINE OF CORRUGATED METAL PIPES

CROSS REFERENCE TO RELATED APPLICATION

This application claims priority from commonly assigned provisional patent application Ser. No. 61/270,338 filed Jul. 7, 2009, entitled "Corrugated Metal Pipe Flow-line Repair," which is incorporated herein by reference.

FIELD OF THE INVENTION

The novel method and system disclosed relates to the repair of damaged flow-lines of corrugated metal pipes. In particular, the present invention relates to a system and method for the reinforcing and sealing of damaged portions of flow-lines of corrugated metal pipe as well as addressing any voids in the earth that have been created surrounding the damaged flow-lines.

BACKGROUND OF THE INVENTION

Corrugated metal pipe is distinguished from other pipes in that it comprises corrugations, which consist of successive bends in the surface of the pipe. The corrugations in the walls of the CMP add stiffness and strength to the pipe. They are used in many projects for a variety of purposes, such as for culverts, storm sewers, subdrains, spillways, underpasses and conveyor conduits. They are also often used to re-line damaged preexisting pipe.

CMP acts as a conduit for fluids, such as sewage and rainwater, and tends to wear and corrode at the bottom of the flow-line of the pipe after years of service. The extent of deterioration depends primarily on soil conditions and the acidity of the water flow. In some instances, this condition can cause sinkholes to form that allow water to escape during heavy rain and destroy property. In such cases, it would be prohibitively expensive and time-consuming to repair the entire pipe and it would not stabilize and fill the void areas exterior to the pipe.

Chapter 10 of the *Handbook of Steel Drainage & Highway Construction Products,* 2nd Canadian ed., Corrugated Steel Pipe Institute, 2007, which is incorporated herein by reference in its entirety, describes the preexisting methods for repairing CMP: In-place installation of concrete invert; Slip line with slightly smaller diameter pipe or tunnel liner plate; Inversion lining, Shortcrete lining; cement mortar lining; and patching. Of these methods, patching is the most inexpensive and adaptable to various sizes and shapes of CMP.

The known methods for patching CMP include the use of polymer and concrete patching compounds or mechanically attaching or welding similar CMP to the damaged area. However, merely patching a damage area of the CMP using only a polymer or concrete provides insufficient structural integrity to the damaged area. The application of concrete patching compounds is quite expensive and time consuming and will not address the problem of voids in the earth that have developed due to erosion at the site of the damaged flow-line.

Simply applying polymer directly to the damaged portion is not effective without some form of molding containment. Without molding containment, the polymer will become unwieldy and, if it is an expanding polymer, it will not attain maximum rigidity upon hardening, since pressure is required to maximize bonding strength.

Attaching only a similar CMP to the damaged area is also non-optimal because the attached plate and the preexisting pipes will constitute two separate structures bound only at the point of attachment and therefore will not be sufficiently reinforced or sealed. This will also not address the problem of voids in the earth surrounding the CMP.

Therefore, an improved method is needed for repairing the damaged portion of the flow-line of a CMP that is cost effective and provides a single monolithic patch as well as filling and stabilizing the surrounding voids created in the soil.

SUMMARY OF THE INVENTION

The problem of repairing damaged flow-lines of CMPs is addressed by the novel system and method disclosed. A series of rigid sheets may be placed in an overlapping manner so that the damaged portion is covered. The rigid sheets can consist of any suitable rigid material such as fiberglass or steel and should be sufficiently wide to cover the CMP beyond the highest point on its sidewalls that are damaged. The rigid sheets may be attached to the CMP and to each other by fasteners such as galvanized steel screws. At least one hole may be cut or preformed into the rigid sheets. Pressure is applied to the overlaid rigid sheets and a hydro-insensitive expanding polymer is injected into the hole or holes. When outcropping of the polymer appears at the corrugations of the CMP next to the sides of the rigid sheet, it may be determined that sufficient polymer has been injected. In addition, if there are voids formed in the earth surrounding the CMP at the damaged portion, the polymer may be injected into the void to stabilize the earth in that region.

A system according to the invention comprises a series of rigid sheets placed in an overlapping fashion so that the damaged portion of the flow-line of a CMP is covered. The rigid sheets can consist of any suitable material such as fiberglass or steel and should be sufficiently wide to cover the CMP beyond the highest point on its sidewalls that are damaged. Fasteners such as galvanized screws attach the rigid sheets to the CMP and each other. The rigid sheets comprise at least one hole. The rigid sheets are placed under pressure and the space between the rigid sheets and CMP is filled with a hydro-sensitive expanding polymer that has been injected into the hole or holes. The system includes gaps formed at the edge of the rigid sheet by the corrugations of the CMP where outcropping of injected polymer may be seen to determine that sufficient polymer has been injected. The system further comprises hydro-insensitive expanding polymer injected into voids in the earth surrounding the damaged portion of the CMP.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a side sectional view of the disclosed method and system.

FIG. 3 is a top sectional view of the disclosed method and system.

DESCRIPTION OF THE PREFERRED EMBODIMENT

Figure 1:
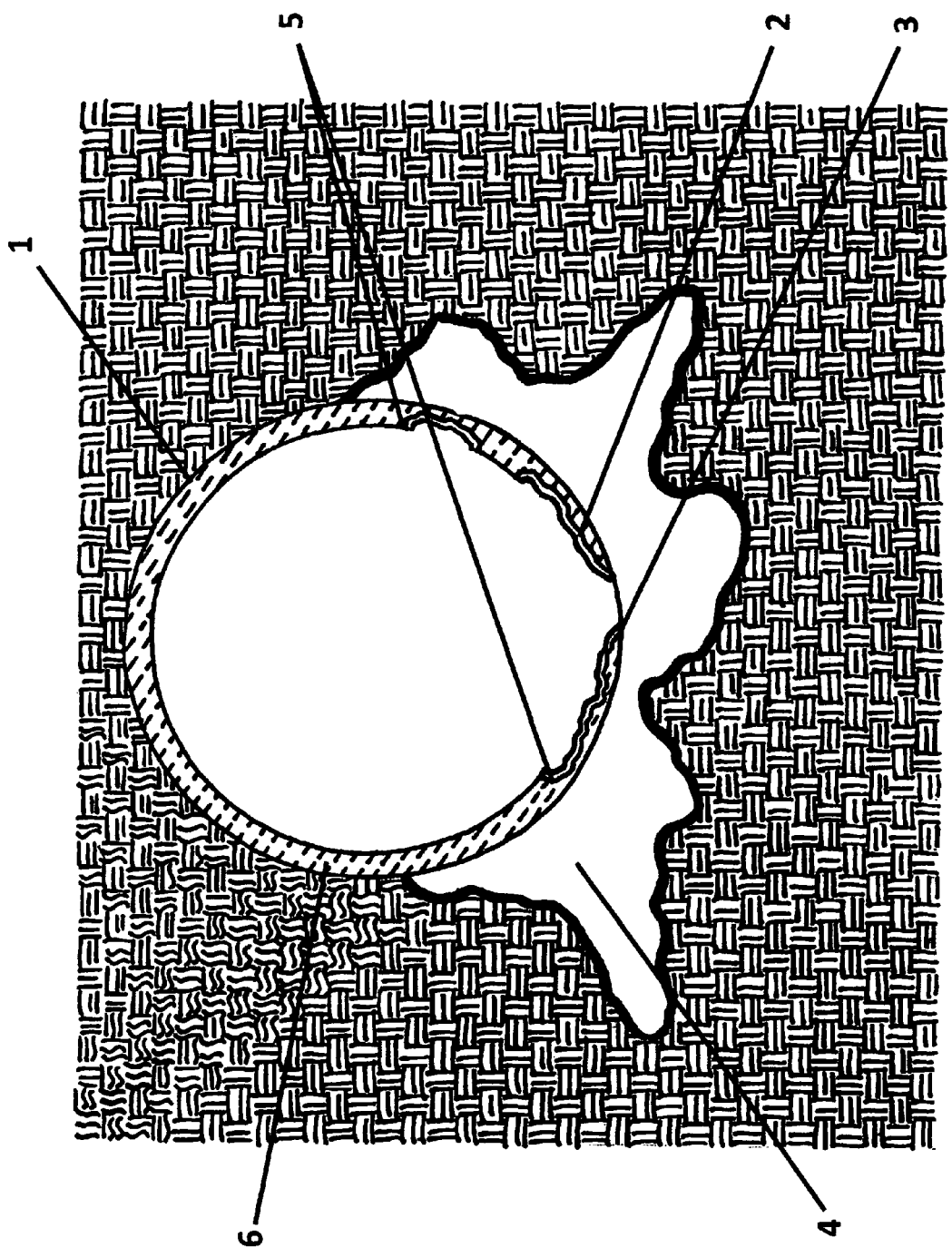
FIG. 1 is a sectional view along the longitudinal axis of a damaged Corrugated Metal Pipe and the earth surrounding the damaged portion.

Referring to FIG. 1, a typical damaged CMP is depicted. As can be seen, a portion of the CMP 1 has been damaged due to a variety of causes, such as rust or corrosion. The damaged portion 2 is located along the flow-line 3 of the CMP where fluids flow through the CMP. Also shown is failed soil in the earth surrounding the damaged portion of the CMP 1. Due to seeping water through holes in the damaged portion of the CMP, voids 4 have formed. These voids put the CMP at structural risk that can result in additional damage to the pipe such as a collapse and create sink holes that can cause further damage to surrounding property. As can be seen, the damaged portion extends to maximum heights 5 on the sidewalls 6 of the CMP 1.

Initially, the soil surrounding the CMP should be stabilized externally as much as possible. The voids 4 in the soil outside the perimeter of the CMP 1 should be located and filled externally with a hydro-insensitive expanding polymer. These polymers will integrate into the surrounding soil and thereby fill, stabilize and solidify them. At the same time, the polymer will fill any joints, holes, or other openings in the wall of the CMP, thus preventing any further inflow and infiltration.

In order to repair and stabilize the damaged portion of the CMP, it is desired to create a monolithic patching that covers and adheres to the entire surface of the CMP where the damage exists as well as the surrounding portions of the CMP. This patch should eliminate the seeping of water and provide a solid monolithic structure that will withstand the weight of high volumes of flowing water and the force of shifting earth outside the CMP. In order to accomplish this, the disclosed method and system combines the creation of containment molds along the flow-line of the CMP and injection of hydro-insensitive expanding polymer into the space within the containment molds.

Figure 4:
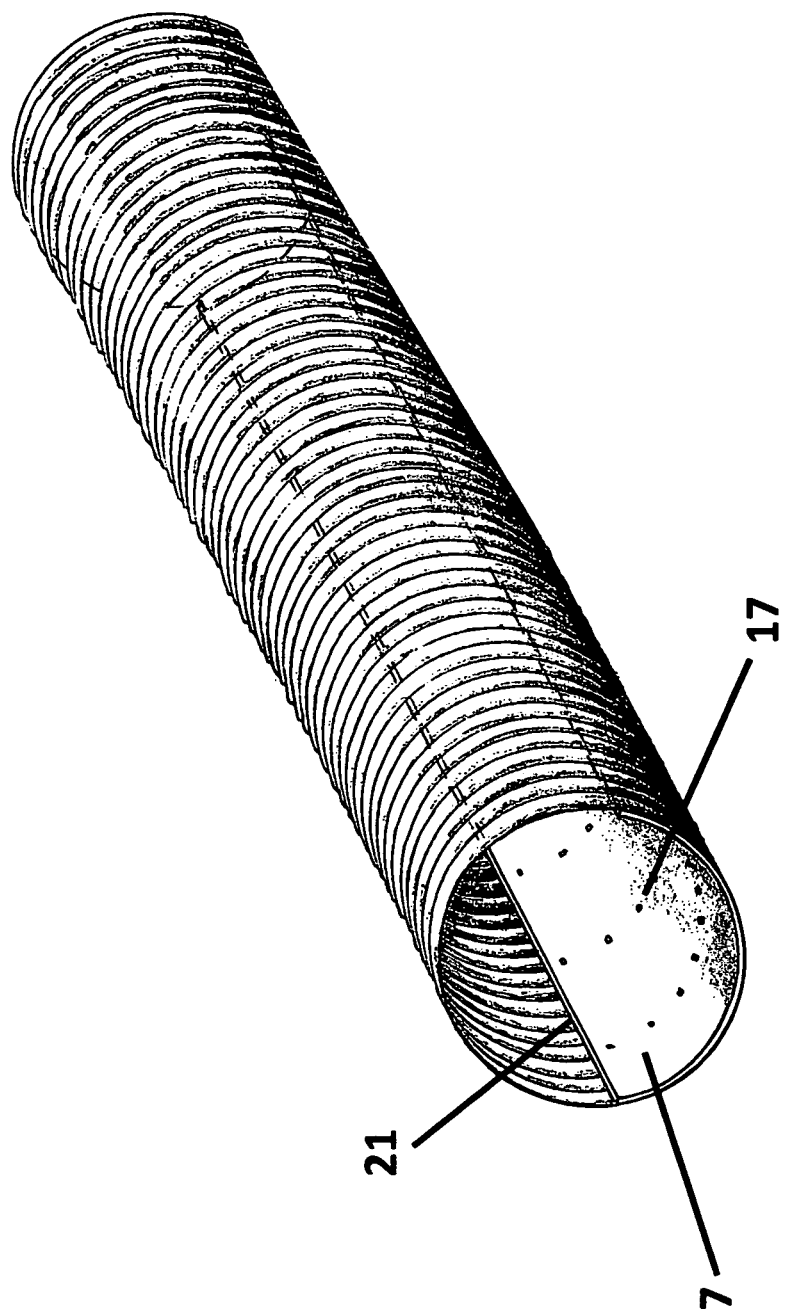
FIG. 4 is a perspective view of the disclosed method and system.

Turning to FIGS. 2, 3, and 4, the containment molds created in accordance with the disclosed method and system is depicted. Prior to application, the entire area, including the damaged portion, of the CMP should be cleaned thoroughly of all loose materials using water blasting or some other mechanical means. A series of rigid sheets 7 having generally the same shape as the interior surface of the CMP 1 are placed in an overlapping fashion to cover the damaged portion of the CMP along the flow-line 8. The rigid sheets may be made of any suitable material such as fiberglass or galvanized steel sheeting. A first sheet 9 is placed to cover a first point 12 on the flow-line 8 that is the beginning of the damaged portion 10 at its lowest elevation as well as the undamaged portion of the CMP 11 next to that first point 12. A plurality of sheets 7 are then applied in an overlapping fashion along the flow-line 8 until the entire damaged portion of the CMP 1 is covered. The last sheet applied will cover a second point 13 on the flow-line 8 where the damaged portion 10 ends as well as the undamaged portion of the CMP 14 next to that second point 13.

For maximum effectiveness, the rigid sheets 7 should be free of all oil coating and should cover at least two times the width of the damaged portion of the CMP 10. The lap at the end of each sheet 15 should have a width of at least six inches. The rigid sheets should be attached to each other and the CMP using suitable fasteners 16 such as one-quarter inch galvanized screws. Note that a gap 21 is formed between the sheets and the corrugations of the CMP.

In order to maximize the security of the repair, the starting and ending transition points of the patch should be reinforced with a galvanized flat bar that is two inches by one-quarter inch and rolled to fit the diameter of the CMP. There should be holes cut in the flat bar that are $5/16$ of an inch in diameter and located approximately three inches apart on center. One-quarter inch galvanized screws may be drilled through these holes and into the CMP. The transition points may need additional modifications depending upon the existing conditions.

Once the rigid sheets have been applied and a containment mold has been created, the next step is to inject hydro-insensitive expanding polymer into the mold to fill the space created between each rigid sheet and the surface of the CMP. Turning to FIG. 4, each rigid sheet 7 should have at least one hole 17, preferably $5/8$ of an inch in diameter, cut or formed in it. The holes in the rigid sheets should be suitably spaced apart to allow for injection under the entire surface of the sheets. In most cases, three feet on center should be sufficient. A gap 21 is formed between the sheets and the corrugations of the CMP.

Figure 5:
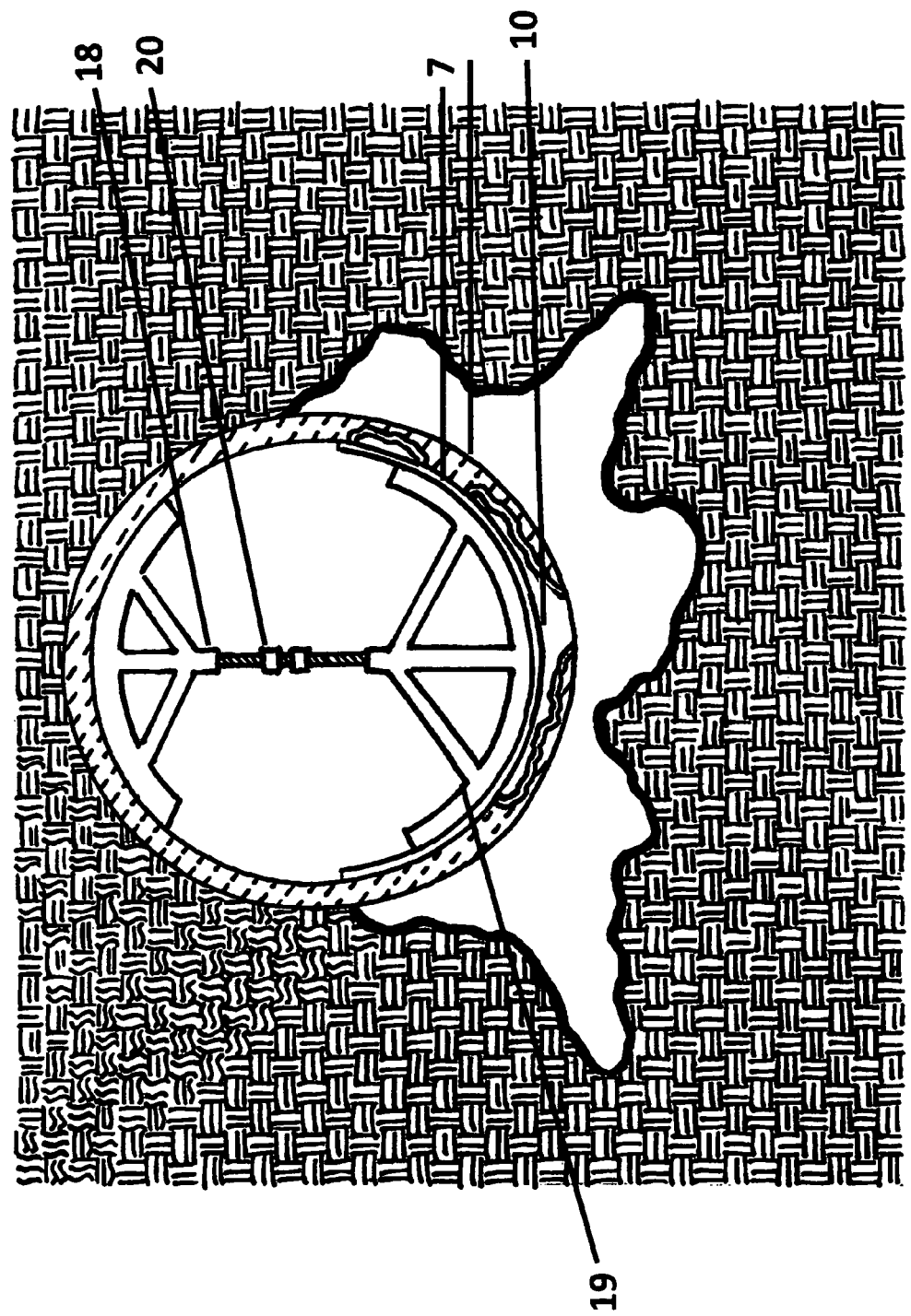
FIG. 5 is a sectional view along the longitudinal axis of a damaged Corrugated Metal Pipe and the earth surrounding the damaged portion, wherein the Corrugated Metal Pipe has been repaired in accordance with the disclosed method and system.
Figure 6:
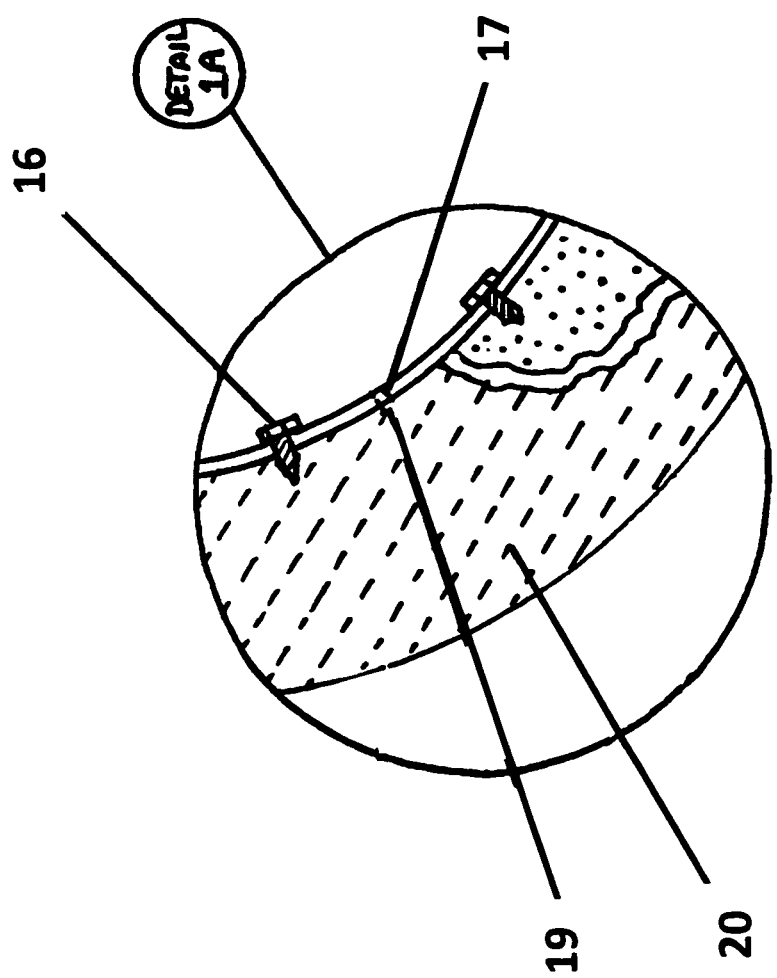
FIG. 6 is a partial sectional view of the disclosed method and system along the longitudinal axis of a Corrugated Metal Pipe demonstrating a hole for injection of hydro-insensitive expanding polymer.

As depicted in FIG. 5, a skid-mounted stiffener frame 18 may be placed on a rigid sheet 7 with the longitudinal skids 19 aligned on each side of an injection hole 17 to allow enough area to easily make the injection. An exemplary injection hole is depicted in FIG. 6, which is a Detail of FIG. 7. The skid comprises a jack 20 that applies pressure against both the top of the CMP and the surface of the rigid sheet 7. If desired, a sled-mounted stiffener could be used as well. After the stiffener frame 18 is placed in position, it is then mechanically jacked against the top of the pipe to hold the rigid sheet solidly in place against the CMP during the injection process. A hydro-insensitive expanding polymer, preferably a closed cell polyurethane, is then injected through each hole 17 to fill the space between the rigid sheet and the CMP and until outcropping can be seen exiting through the gap 21 formed between the edge of the sheet along the side wall and the corrugations of the CMP. One example of a suitable polymer is the URETEK 486 Star two-part expanding polymer. The structural polymer seals and bonds the CMP to the wear surface. After the polymer cures the skid 18 is moved forward over the next hole for injection and repeated until the project is completed. In addition to filling the space between the sheet and the CMP, the polymer will pass through holes in the side of the CMP and further fill the voids 4 surrounding the CMP.

Figure 7:
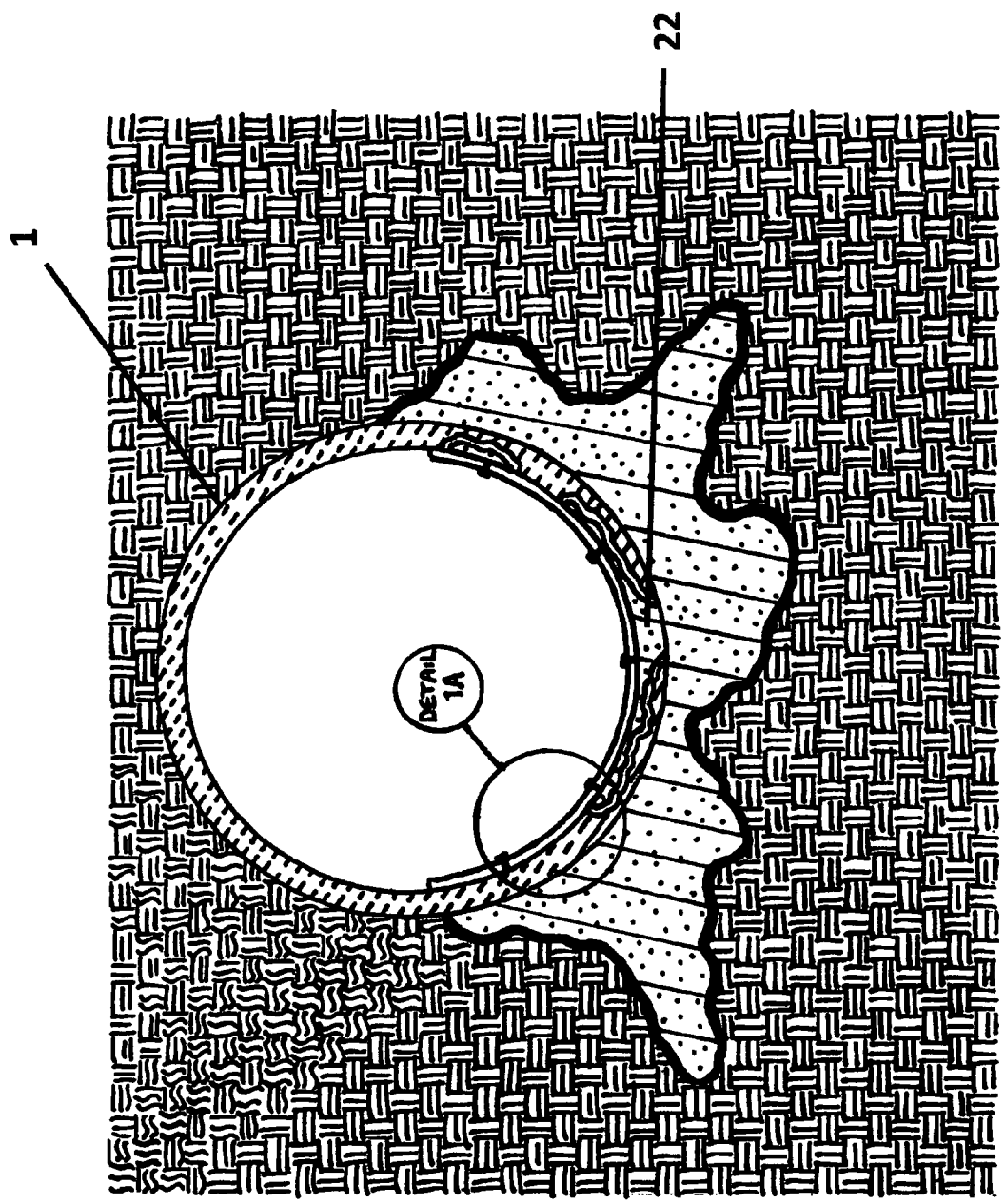
FIG. 7 is a sectional view along the longitudinal axis of a damaged Corrugated Metal Pipe and the earth surrounding the damaged portion, wherein an adjustable jack is applying pressure against a rigid sheet in accordance with the disclosed method and system.

Making reference to FIG. 7, after the process is completed, the hydro-insensitive expanding polymer 22 will have filled the space between the sheets and the CMP and will have hardened under pressure. The hardening under pressure makes the polymer stronger structurally and creates greater adhesion to the CMP and the sheets. The result is a single monolithic structure, comprising the repaired area of the CMP, the polymer and the sheets. The voids 4 will also be filled with the hydro-insensitive expanding polymer.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method for repairing a damaged portion of the flow-line of a corrugated metal pipe (CMP), wherein the damaged portion extends from a first point to a second point of the flow-line, comprising:
   placing a plurality of rigid sheets over the damaged portion in an overlapping manner such that a first sheet covers both the first point and an undamaged portion of the CMP next to the first point and a second sheet covers both the second point and an undamaged portion of the CMP next to the second point, and wherein the sheets cover the CMP from the flow-line and extending to points on its sidewalls that are undamaged along the length of the damaged portion;
   applying a plurality of fasteners to connect said rigid sheets and CMP, wherein at least one of the fasteners is applied to the overlapping portions of the rigid sheets;
   applying pressure to the surface of each of the rigid sheets; and
   injecting a hydro-insensitive expanding polymer into a hole in each of the rigid sheets to fill a space between the sheets and the damaged portion of the CMP.

2. The method of claim 1 wherein the injection is continued until outcropping of polymer is revealed at the corrugations of the CMP along an edge of a rigid sheet.

3. The method of claim 1 comprising injecting a hydro-insensitive polymer into any voids in the earth surrounding the damaged portion of the CMP.

4. The method of claim 1 wherein said rigid sheets comprise a fiberglass material.

5. The method of claim 1 wherein said rigid sheets comprise galvanized steel.

6. The method of claim 1 wherein the surface area of the undamaged portion of the CMP that is covered by the rigid sheets is at least equal to the surface area of the damaged portion of the CMP.

7. The method of claim 1 wherein the overlap of the rigid sheets is at least six inches wide.

8. The method of claim 1 comprising:
   applying a plurality of fasteners to connect a first bar, the first rigid sheet, and the undamaged portion of the CMP next to the first point.

9. The method of claim 8 comprising:
   applying a plurality of fasteners to connect a second bar, the second rigid sheet, and the undamaged portion of the CMP next to the second point.

10. The method of claim 9 wherein said first and second bars are galvanized.

11. The method of claim 1 wherein the fasteners are galvanized screws.

12. The method of claim 1 wherein the holes in said rigid sheets are 5/8 inches in diameter.

13. The method of claim 1 wherein said pressure is applied by a sled-mounted stiffener frame.

14. The method of claim 1 wherein said pressure is applied by a skid-mounted stiffener frame.

15. The method of claim 1 wherein the pressure applied to the rigid sheets compresses the hydro-insensitive expanding polymer during hardening.

16. The method of claim 1 wherein the hydro-insensitive expanding polymer comprises closed cell polyurethane.

17. A system for repairing a damaged portion of the flow-line of a corrugated metal pipe (CMP), wherein the damaged portion extends from a first point to a second point of the flow-line, comprising:
   a plurality of rigid sheets placed over the damaged portion in an overlapping manner such that a first sheet covers both the first point and an undamaged portion of the CMP next to the first point and a second sheet covers both the second point and an undamaged portion of the CMP next to the second point, and wherein the sheets cover the CMP from the flow-line and extending to points on its sidewalls that are undamaged along the length of the damaged portion;
   a plurality of fasteners applied to connect said rigid sheets and CMP, wherein at least one of the fasteners is applied to the overlapping portions of the rigid sheets;
   a mounted stiffener applying pressure to the surface of each of the rigid sheets and the top of the CMP using a jack mechanism; and
   a hydro-insensitive expanding polymer injected into a hole in each of the rigid sheets to fill the space between the sheets and the damaged portion of the CMP.

18. The system of claim 17 wherein the hydro-insensitive expanding polymer comprises closed cell polyurethane.

19. The system of claim 17 wherein the space is formed between the corrugations of the CMP and the rigid sheets.

20. The system of claim 17 wherein the surface area of the undamaged portion of the CMP that is covered by the rigid sheets is at least equal to the surface area of the damaged portion of the CMP.

* * * * *